United States Patent
Rooks et al.

(10) Patent No.: US 8,489,090 B2
(45) Date of Patent: Jul. 16, 2013

(54) AIRCRAFT WIRELESS COMMUNICATION SYSTEM

(75) Inventors: Kelsyn D. S. Rooks, Overland Park, KS (US); Jeffrey Sweeney, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 363 days.

(21) Appl. No.: 12/471,673

(22) Filed: May 26, 2009

(65) Prior Publication Data

US 2010/0304739 A1  Dec. 2, 2010

(51) Int. Cl.
*H04W 4/00* (2009.01)
(52) U.S. Cl.
USPC .......................... 455/431; 455/430; 455/432.1
(58) Field of Classification Search
USPC ........................................ 455/431, 430, 432.1
See application file for complete search history.

(56) References Cited

U.S. PATENT DOCUMENTS

| | | | |
|---|---|---|---|
| 5,212,804 A * | 5/1993 | Choate | 455/431 |
| 7,113,780 B2 | 9/2006 | McKenna et al. | |
| 2003/0008652 A1* | 1/2003 | Jochim et al. | 455/431 |
| 2007/0021117 A1* | 1/2007 | McKenna et al. | 455/431 |
| 2007/0161347 A1* | 7/2007 | Ma et al. | 455/11.1 |
| 2008/0285730 A1* | 11/2008 | Allaway et al. | 379/88.14 |

* cited by examiner

*Primary Examiner* — Kamran Afshar
*Assistant Examiner* — Omoniyi Obayanju
(74) *Attorney, Agent, or Firm* — Patton Boggs LLP

(57) ABSTRACT

Embodiments of the disclosed invention include an apparatus, method, and computer program product for providing wireless service to devices located onboard an aircraft. For example, in one embodiment, a wireless base station is utilized onboard an aircraft for providing non-roaming cellular services to cellular devices onboard the aircraft. In addition, in some embodiments, the wireless base station may provide Internet access to Internet accessible devices located onboard the aircraft. Additionally, in some embodiments, the wireless base station is interfaced with an existing air-to-ground cellular transmission system of the aircraft.

18 Claims, 4 Drawing Sheets

AIRCRAFT WIRELESS COMMUNICATION SYSTEM

BACKGROUND OF THE INVENTION

In the United States, both the Federal Aviation Administration (FAA) and the Federal Communications Commission (FCC) regulate the use of mobile phones on aircraft. Safety concerns exist for both the cell networks and the airplane when traditional terrestrial cell phones are used in flight. Government agencies worry that because cell phones emit radio signals, they can interfere with sensitive aviation electronics like communications equipment or the navigation system. In addition, use of cellular devices may interfere with terrestrial cellular networks because mobile devices at high altitudes may be equidistant from multiple cellular towers of many different cells, thus, creating confusion for call routing. In addition, cellular phones may have to transmit at maximum power to be received, if at all, by the terrestrial cellular towers, thus, increasing the risk of interference with electronic equipment on the aircraft.

Airlines have attempted to provide a solution to onboard phone service with introduction of the Airfone® service in the 1980s which was based on radio technology. The Airfone® service provided a solution to some of the above problems by using a dedicated 800 Mhz air-to-ground frequency for communicating with special terrestrial cellular towers that are placed spatially apart from each other. However, use of the Airfone service has been very limited for several reasons. For example, these services are much more expensive than mobile phone service. In addition, they also provide extremely slow data services at a similarly high price. Additionally, use of the Airfone service does not allow a user to utilize features associated with mobile phones, such as, but not limited to, speed dialing or address book lookup.

Recently, several studies have shown that using wireless devices, such as, but not limited to, cellular phones onboard an aircraft, does not interfere with electronic equipment on the aircraft. In fact, the use of mobile telephones aboard commercial aircraft is gradually being accepted overseas. For instance, many European air carriers have allowed passengers to utilize mobile phones during flight, assuming the mobile device is capable of picking up a cellular signal. Some carriers have installed a picocell system for routing cellular communications to a satellite and then down to a satellite receiver. However, current picocell systems are extremely expensive because they require one or more satellites for routing the cellular communications. In addition, current picocell systems support only one frequency, typically an international roaming frequency, thus, mobile devices onboard an aircraft, if capable, must roam on this frequency for making calls. As a consequence, a consumer is typically charged international roaming rates, such as $2.50 a minute for calls made on their mobile devices while onboard an aircraft.

Therefore, the disclosed embodiments recognize a need for providing an alternative method for providing wireless service, such as, but not limited to, cellular service onboard an aircraft that seeks to overcome one or more the above problems.

SUMMARY

Embodiments of the disclosed invention include an apparatus, method, and computer program product for providing wireless service to devices located onboard an aircraft. For example, in one embodiment, a wireless base station is utilized onboard an aircraft for providing non-roaming cellular services to cellular devices onboard the aircraft. In one embodiment, the wireless base station includes one or more transceivers for sending and receiving cellular signals at a plurality of cellular frequencies corresponding to one or more service provider networks associated with a plurality of mobile devices located onboard the aircraft. In addition, in some embodiments, the wireless base station includes a conversion unit for converting the cellular signals from the plurality of cellular frequencies corresponding to one or more service providers' networks to one or more coded cellular signals that are not detectable by conventional ground-based cell sites. Additionally, the wireless base station may include an interface for communicatively coupling the wireless base station to a cellular transmission system of the aircraft for transmitting the one or more coded cellular signals to a terrestrial tower configured to communicate with the cellular transmission system of the aircraft for enabling cellular communication to the first mobile device.

BRIEF DESCRIPTION OF THE DRAWINGS

Illustrative embodiments of the present invention are described in detail below with reference to the attached figures, which are incorporated by reference herein and wherein.

DETAILED DESCRIPTION OF THE DRAWINGS

Embodiments of the disclosed invention include an apparatus, method, and computer program product for providing wireless service to devices located onboard an aircraft. For example, in one embodiment, a wireless base station is utilized onboard an aircraft for providing non-roaming cellular services to cellular devices onboard the aircraft. In addition, in some embodiments, the wireless base station may provide Internet access to Internet accessible devices located onboard the aircraft. Additionally, in some embodiments, the wireless base station is interfaced with an existing air-to-ground cellular transmission system of the aircraft for communicating the cellular signals to specially configured terrestrial towers.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
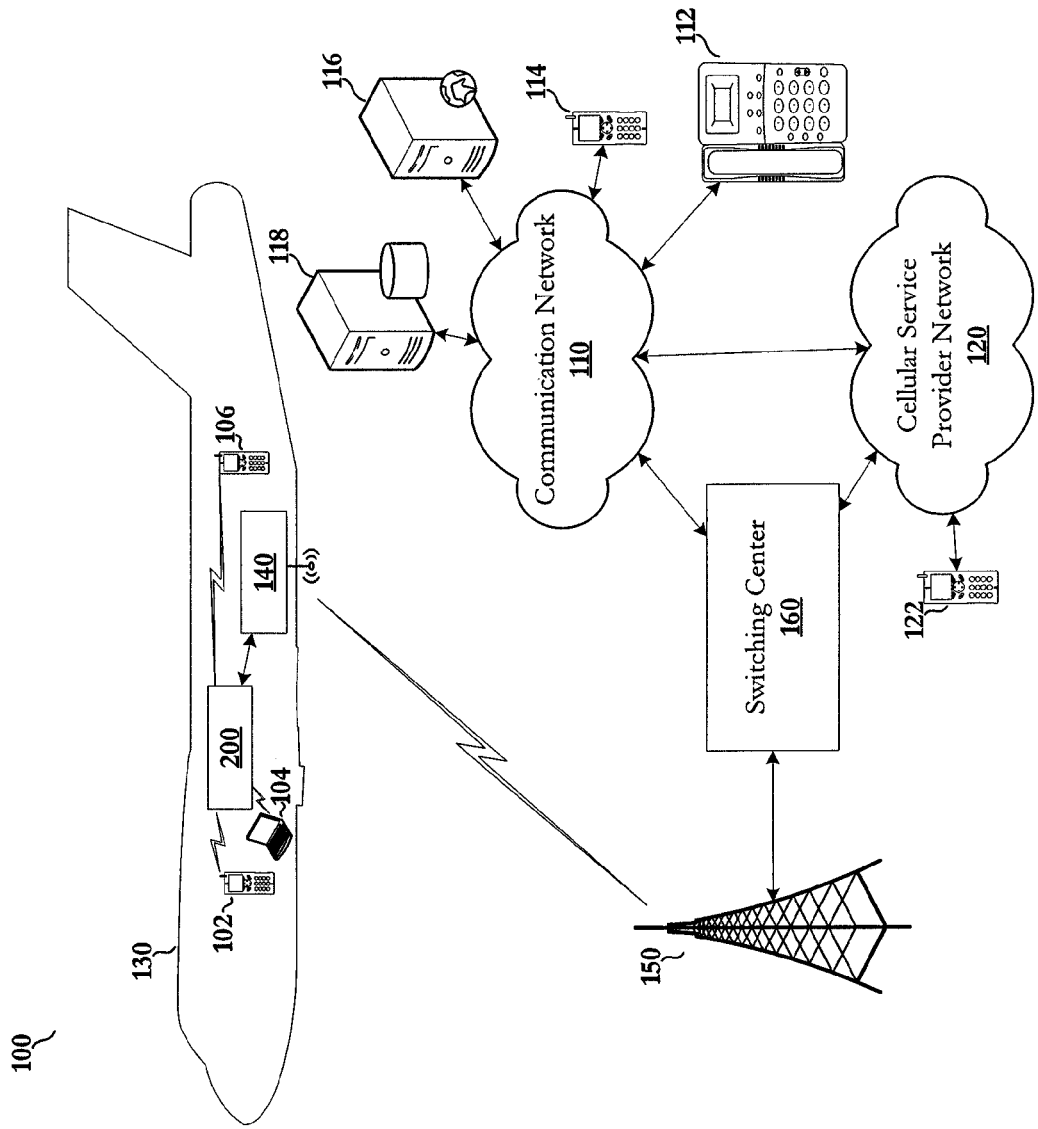
FIG. 1 depicts an embodiment of a network environment in which the illustrative embodiments may be implemented.

FIG. 1 depicts an embodiment of a network environment 100 in which the illustrative embodiments may be implemented. In the depicted embodiment, a wireless base station 200 is placed onboard an aircraft 130 for providing wireless services, including, but not limited to, cellular service to a plurality of cellular devices such as cellular device 102 and cellular device 106 located onboard aircraft 130. For instance, in accordance with one embodiment, wireless base station 200 may be an intelligent femto cell that is manufactured and configured to facilitate cellular communication to the plurality of cellular devices located onboard aircraft 130. A femto cell is a miniature cell tower, generally about the same size as a wireless router, that is utilized to provide and/or improve cellular service to cellular devices that are located in areas that do not receive adequate cellular coverage.

In particular, in one embodiment, wireless base station 200 may include one or more transceivers that are operable to communicate with the plurality of cellular devices on their respective cellular frequencies associated with a cellular service provider network of each cellular device. For instance, in some embodiments, wireless base station 200 may include one or more transceivers that are operable to communicate cellular signals on a plurality of frequency ranges commonly associated with cellular service providers, such as, but not limited to, 400, 850, 900, 1800, and 1900 MHz frequency bands. In addition, in some embodiments, wireless base station 200 may support a plurality of cellular network technologies including, but not limited to, Advanced Mobile Phone Service (AMPS), Narrowband Advanced Mobile Phone Service (NAMPS), Code Division Multiple Access (CDMA), Global System for Mobil communication (GSM), and Personal Communications Services (PCS).

Additionally, as will be further described, in some embodiments, wireless base station 200 may provide wireless Internet access to one or more wireless Internet accessible devices, such as, but not limited to, a laptop computer 104, a smart phone, and/or a personal digital assistant (PDA) device. For instance, in some embodiments, wireless base station 200 may include one or more transceivers that support a plurality of data transmission technologies including, but not limited to, Enhanced Data Rates for GSM Evolution (EDGE), Worldwide Interoperability for Microwave Access (WiMAX), Long Term Evolution (LTE), Wi-Fi, and 3G/4G technology, for providing wireless data service to wireless Internet accessible devices located onboard aircraft 130.

In accordance with one embodiment, wireless base station 200 includes an interface for communicating with a cellular transmission system 140 of aircraft 130 for transmitting cellular signals to a terrestrial tower 150 that is specially configured to communicate with cellular transmission system 140 for enabling cellular communication to the plurality of cellular devices onboard aircraft 130. In one embodiment, cellular transmission system 140 sends and receives cellular signals from one or more antennas mounted on the outside of aircraft 130. In addition, in accordance with some embodiments, cellular transmission system 140 may be an existing cellular transmission system of aircraft 130. For instance, cellular transmission system 140 may be utilized or may have been utilized to provide phone service to passengers onboard aircraft 130 using telephone devices installed on aircraft 130 (e.g., an Airfone® device).

In addition, in some embodiments, terrestrial tower 150 may be an existing terrestrial tower, such as, but not limited to, an Airfone® tower or an Aircell® tower, that is specially configured to communicate with cellular transmission system 140. Alternatively, a network of terrestrial towers 150 may be constructed for communicating with cellular transmission system 140. In one embodiment, terrestrial tower 150 is widely spaced from other terrestrial towers that are capable of communicating with cellular transmission system 140 to ensure that cellular transmission system 140 only communicates with one terrestrial tower at time for facilitating proper routing of cellular signals. In one embodiment, terrestrial tower 150 may include one or more air-to-ground antennas for communicating with cellular transmission system 140. Additionally, in some embodiments, terrestrial tower 150 and cellular transmission system 140 may use an exclusive air-to-ground frequency that does not interfere with conventional ground-based cell sites. Alternatively, in other embodiments, terrestrial tower 150 and cellular transmission system 140 may transmit encoded signals on the same frequencies as other cellular carriers that are not detectable by the conventional ground-based cell sites. In these embodiments, only terrestrial towers that are equipped with specialized antennas may receive the signals from cellular transmission system 140. In some embodiments, terrestrial tower 150 and cellular transmission system 140 must establish communication using a specific handshake protocol. A handshake protocol sets the communication parameters that are acceptable to equipment and systems at both ends of the communication channel, including, but not limited to, information transfer rate, coding alphabet, parity, interrupt procedure, and other protocol or hardware features.

As referenced herein, the phrase "not detectable" is defined as unable to receive, unable to decode, and/or unable to interpret data associated with transmissions from cellular transmission system 140. For instance, in some embodiments, a regular terrestrial tower may be able to receive the cellular transmission signals from cellular transmission system 140, but not be able to decode, interpret, and/or perform an action in association with cellular transmission signal.

In accordance with one embodiment, the cellular signals received from terrestrial tower 150 are routed to a switching center 160. Switching center 160 is a node in a telecommunications circuit switching network which routes communications to intended destination devices. In some embodiments, switching center 160 may be a building, such as, a mobile switching center (MSC) or a central office that houses switching equipment and may include live operators. In other embodiments, switching center 160 may be an automatic exchange, such as, a telephone circuit box or a mobile switching centre server, which is configured to provide automated routing. For instance, as will be further described, switching center 160 may route cellular calls from cellular device 102 located onboard aircraft 130 to a cellular service provider network 120 associated with a cellular device 122 for facilitating cellular communication between cellular device 102 and cellular device 122.

In addition, in some embodiments, switching center 160 may communicate with a communication network 110 for facilitating data and/or voice exchange for one or more wireless device located onboard aircraft 130. In one embodiment, communication network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). For instance, in one embodiment, laptop computer 104 and/or cellular device 102 may access a Web server 116 and/or a database server 118 for retrieving content/data via communication network 110. Additionally, communication network 110 may include other types of data networks, such as, but not limited to, an intranet, a private local area network (LAN), a wide area network (WAN), and a wireless local area network (WLAN).

In addition, in some embodiments, communication network 110 may include one or more wired or wireless phone networks. For example, communication network 110 may include a public switched telephone network (PSTN) for facilitating voice communication landline telephone devices, such as, telephone 112. The public switched telephone network is the standard analog telephone network utilized by most homes. In addition, in some embodiments, communication network 110 may also include digital telephone networks, such as, but not limited to, an integrated services digital network (ISDN) and a fiber distributed data interface (FDDI) network. Additionally, in some embodiments, communication network 110 may include one or more cellular networks, such as, but not limited to, a Global System for Mobile Communications (GSM) network and a Code-Division Multiple Access (CDMA) network for facilitating voice communications to cellular devices, such as, cellular device 114.

Figure 2:
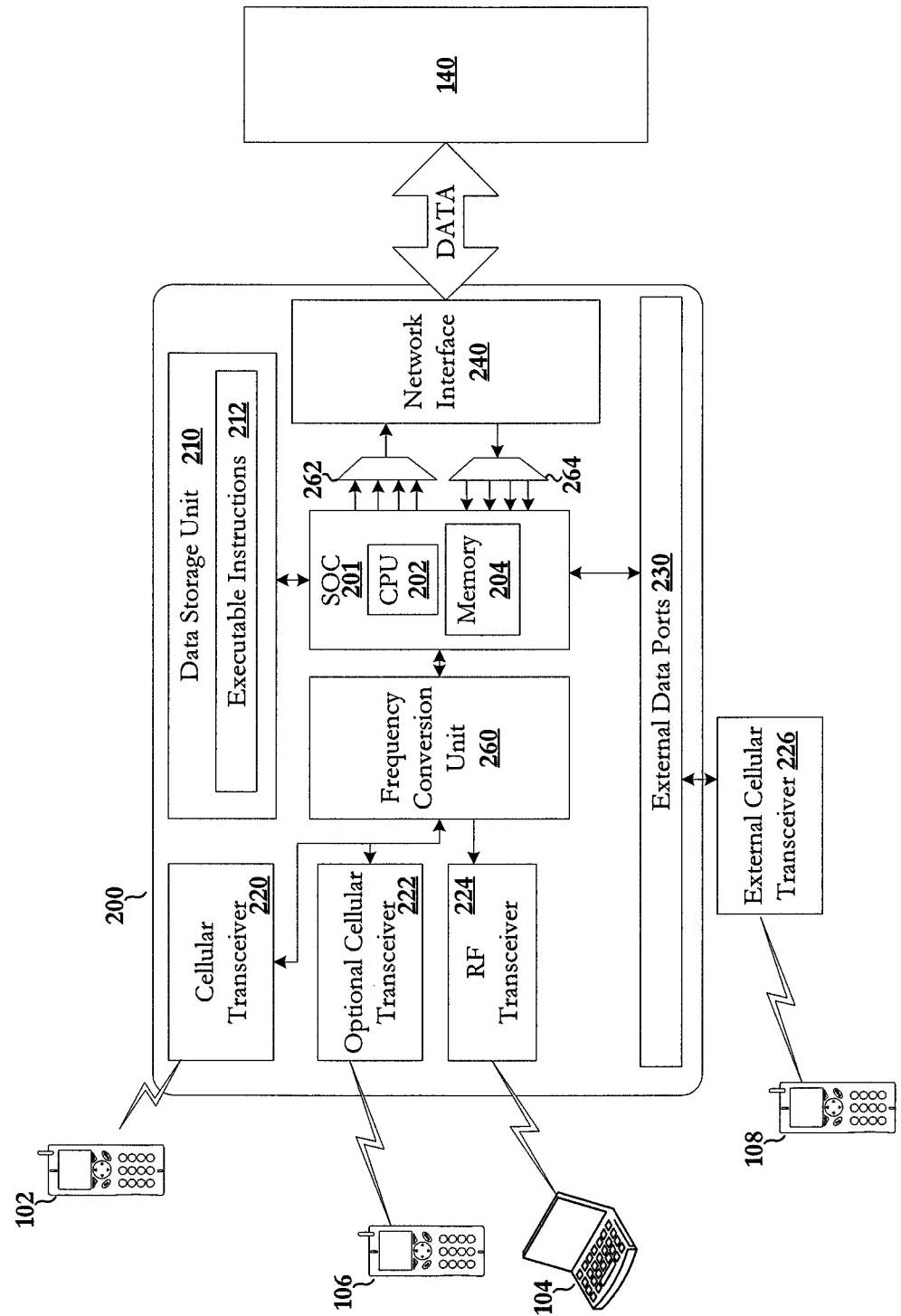
FIG. 2 depicts an embodiment of a wireless base station in accordance with the illustrative embodiments.

With reference now to FIG. 2, an embodiment of wireless base station 200 is presented in accordance with certain of the disclosed embodiments. For example, in some embodiments, wireless base station 200 may include a system-on-a-chip (SoC) 201. In one embodiment, SoC 201 may integrate all or a majority of the components of wireless base station 200, such as, but not limited to, one or more processors/microprocessors 202 and memory 204 (e.g., RAM), into a single integrated circuit chip.

In addition, in some embodiments, wireless base station 200 may include one or more data storage units 210, such as, but not limited to, a hard disk drive for storing executable instructions 212 and/or other data, such as, but not limited to, access rules, routing tables, quality of service (QoS) rules, and cost information for intelligent routing. For instance, in some embodiments, executable instructions 212 may include executable instructions for limiting access to only registered devices using the access rules, converting signals between a cellular service provider network frequency and an air-to-ground radio frequency utilized by cellular transmission system 140, and ensuring priority to voice communication over data communication using the quality of service (QoS) rules.

In accordance with one embodiment, wireless base station 200 may include a cellular transceiver 220 for communicating cellular signals between wireless base station 200 and one or more cellular devices within signal range of wireless base station 200. For instance, wireless base station 200 may be configured to communicate, on a control channel, with cellular devices that are within signal range of wireless base station 200 to determine the mobile identification number/cellular phone number associated with the detected mobile devices. A control channel is a logic channel carrying network information rather than the actual voice or data messages transmitted over the network for enabling cellular devices to identify themselves and their location to the cellular networks.

In some embodiments, cellular transceiver 220 may be configured to send and receive cellular signals associated with a particular cellular service provider and/or frequency spectrum. Alternatively, in some embodiments, cellular transceiver 220 may be configured to send and receive cellular signals associated with a particular type of cellular network, such as, but not limited to, a Global System for Mobile communications (GSM) network, 2G/3G/4G networks, and/or a Code Division Multiple Access (CDMA) network. Optionally, in some embodiments, wireless base station 200 may include multiple cellular transceivers, such as, optional cellular transceiver 222. For instance, in some embodiments, optional cellular transceiver 222 may be configured to operate on a different service provider cellular network than that associated with cellular transceiver 220.

In addition, in some embodiments, wireless base station 200 may include a radio frequency (RF) transceiver 224. In one embodiment, radio frequency transceiver 224 supports the Wireless Application Protocol (WAP) and/or Wi-Fi standard for enabling wireless data communication with one or more wireless Internet accessible devices, such as, but not limited to, laptop computer 104 and/or a PDA device with Wi-Fi capabilities.

Additionally, in some embodiments, wireless base station 200 may include one or more external data ports 220 (e.g., a USB port) for transferring and/or storing data on an external data storage unit and/or for connecting wireless base station 200 to an external device. For example, in some embodiments, wireless base station 200 may interface with one or more external transceivers (i.e., add-on units), such as, but not limited to, external cellular transceiver 226. For instance, in some embodiments, external cellular transceiver 226 may be added to provide non-roaming cellular service to cellular devices on an international flight.

In accordance with one embodiment, wireless base station 200 may include a frequency conversion unit 260 for converting the cellular signals and/or Wi-Fi signals received from cellular transceiver 220, cellular transceiver 222, radio frequency (RF) transceiver 224, and/or external cellular transceiver 226, to the appropriate air-to-ground frequency utilized by cellular transmission system 140, such as, but not limited to, the 800 MHz air-to-ground frequency spectrum approved by the FCC. For instance, in one embodiment, frequency conversion unit 260 may include a local oscillator and frequency mixer. A local oscillator is an electronic device used to generate a signal normally for the purpose of converting a signal of interest to a different frequency using a mixer. This process of frequency conversion, also referred to as heterodyning, produces the sum and difference of the local oscillator and input signal of interest. In one embodiment, the air-to-ground frequency utilized by cellular transmission system 140 is not detectable by conventional ground-based cell sites. Alternatively, or in addition to, in some embodiments, a converted signal may be passed to SoC 201 for encoding to ensure that only specially configured terrestrial towers, such as, but not limited to, terrestrial tower 150 are able to receive the cellular signals transmitted by cellular transmission system 140. In addition, in some embodiments, wireless base station 200 may include a multiplexer 262 for combining the one or more encoded cellular signals into a single signal.

Additionally, in one embodiment, wireless base station 200 includes a network interface 240 for communicatively coupling wireless base station 200 to one or more devices, such as, but not limited to, cellular transmission system 140. For example, in one embodiment, network interface 240 may be a network interface card, such as, but not limited to, a modem, an Ethernet card, and/or a wireless network interface card for connecting wireless base station 200 to cellular transmission system 140 for enabling the transfer of the cellular signals to terrestrial tower 150.

In addition, network interface 240 may be utilized to receive incoming signals from cellular transmission system 140. In some embodiments, wireless base station 200 may include a demultiplexer 264 for performing the reverse action of multiplexer 262 (i.e., for separating a combined signal received from cellular transmission system 140 into multiple individuals signals). Additionally, in one embodiment, the received signals are decoded by SoC 201 and pass to frequency conversion unit 260 for converting the signal from the air-to-ground frequency utilized by cellular transmission system 140 to the cellular frequency corresponding to the service provider cellular network of the receiving cellular device.

Figure 3:
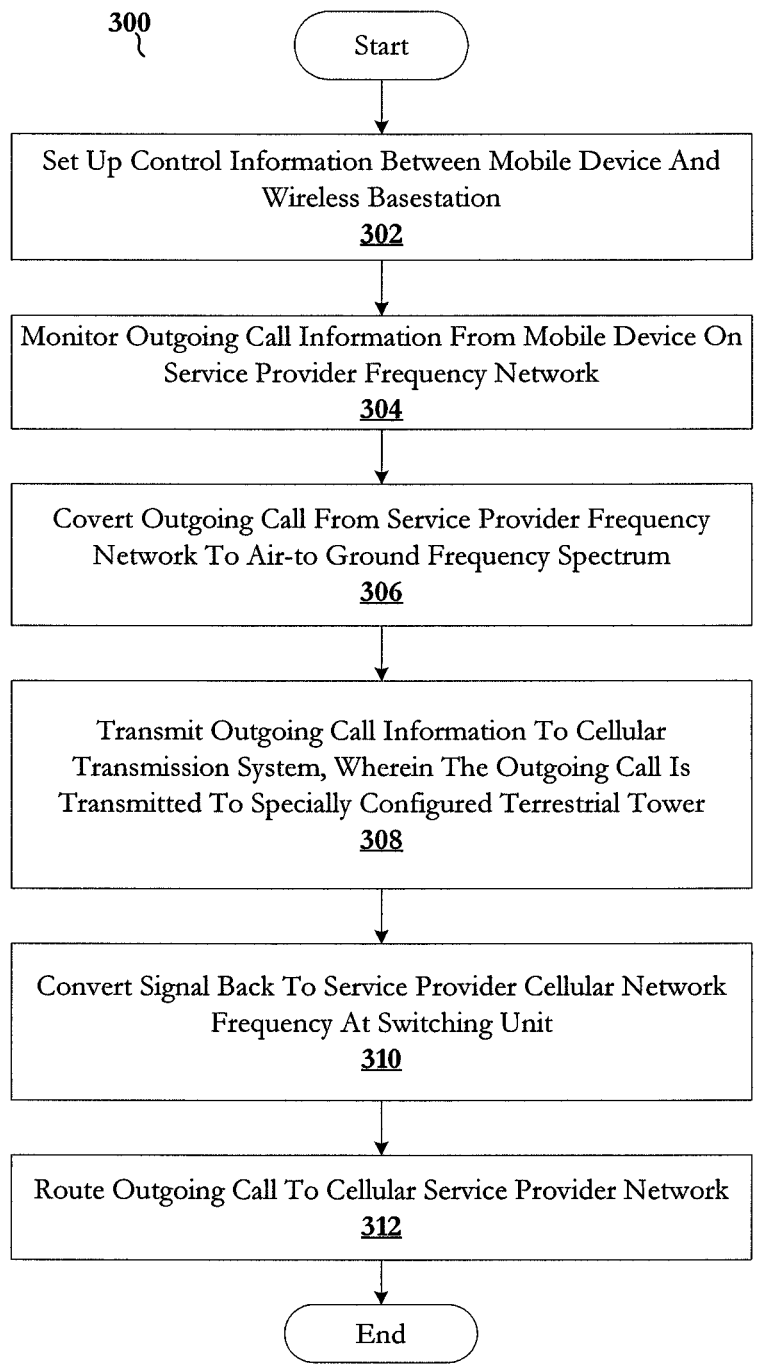
FIG. 3 depicts an embodiment of a process for providing cellular communications to cellular devices located onboard an aircraft in accordance with some of the disclosed embodiments.

FIG. 3 depicts an embodiment of a process 300 for providing cellular communications to cellular devices located onboard an aircraft in accordance with some of the disclosed embodiments. Process 300 begins, at step 302, by establishing communication between wireless base station 200 and a mobile device located onboard aircraft 130. For instance, process 300 may utilize a control channel to communicate with a mobile device located within signal range of wireless base station 200 to determine the mobile identification number (MIN) or International Mobile Equipment Identity (IMEI) associated with the mobile device. In one embodiment, process 300 may check the MIN or IMEI of the mobile device against a stored access list of registered devices for granting access to wireless base station 200. In one embodiment, if the process determines that a mobile device may utilize wireless base station 200, the process transmits the necessary communication data to the mobile device to enable the mobile device to home/route its communication through wireless base station 200. The process, at step 304, monitors for any outbound communication from the mobile device on the same frequency spectrum associated with a service provider cellular network corresponding to the mobile device.

In response to receiving an outbound cellular communication signal from the mobile device, the process, at step 306, converts the cellular signal from the service provider cellular network frequency to an air-to-ground frequency utilized by cellular transmission system 140 of the aircraft. At step 308, the process transmits the converted/encoded cellular signal from wireless base station 200 to cellular transmission system 140. The process transmits the encoded cellular signal to a terrestrial tower specially configured to receive the encoded cellular signal from cellular transmission system 140.

In some embodiments, the encoded cellular signal is then routed to a switching center, such as, switching center 160. In one embodiment, at step 308, switching center 160 may include a frequency conversion unit, such as, frequency conversion unit 260 as described above, for converting the received cellular signal from the air-to-ground frequency to a service provider cellular network frequency associated with the cellular device located onboard the aircraft. In one embodiment, the process routes the cellular signal to the cellular network of the service provider of the cellular device for further routing of the cellular communication to the appropriate destination device, with process 300 terminating thereafter.

Alternatively, in some embodiments, the process may route the cellular signals to a contract service provider cellular network for handling the cellular communication of the cellular devices located onboard an aircraft. A contract service provider is defined as a cellular and/or Internet service provider that has an agreement with the operators of the disclosed aircraft wireless communication system to provide cellular service to devices onboard an aircraft. Thus, operators of the disclosed aircraft wireless communication system may contract with a particular service provider for providing cellular and/or data service to all cellular devices onboard an aircraft. In addition, in some embodiments, process 300 may monitor the duration of a call and/or the amount of communicated data associated with a mobile device for the purpose of billing a subscriber associated with the mobile device.

Figure 4:
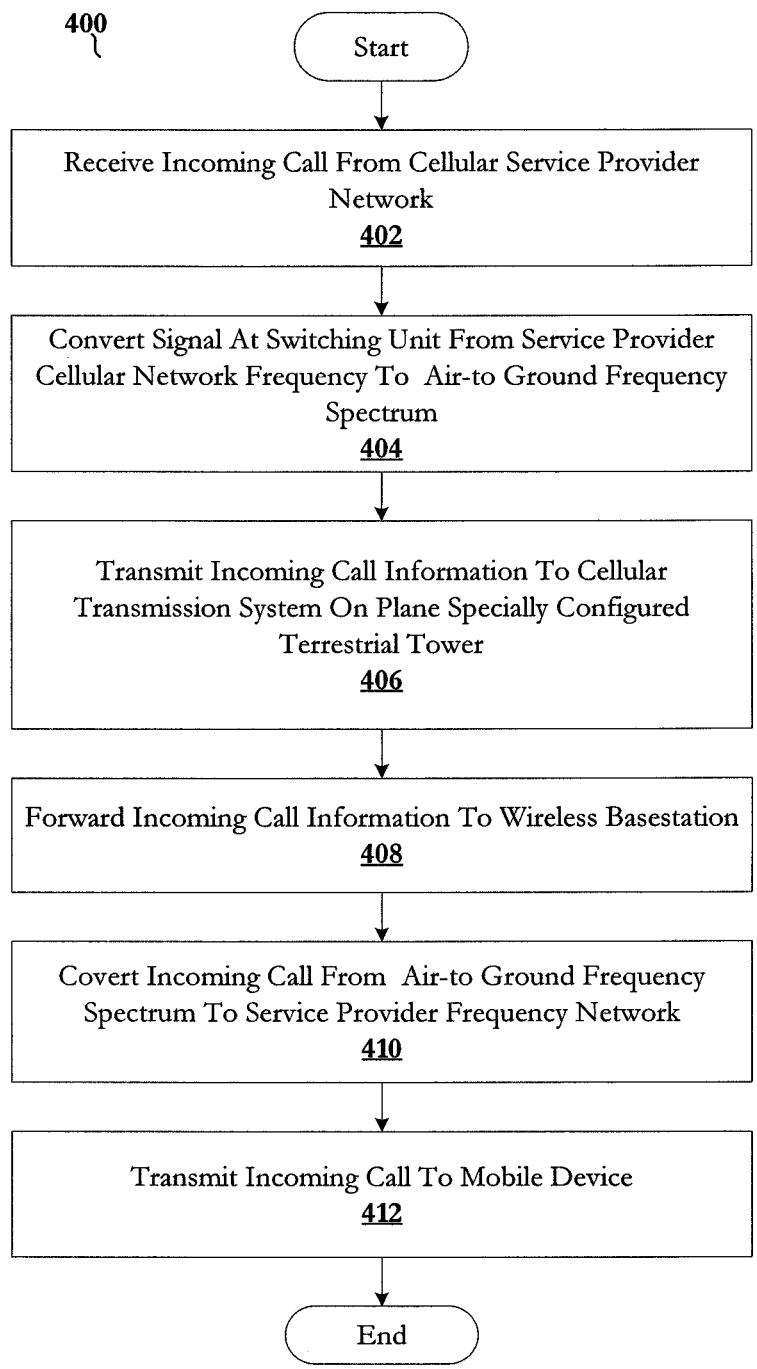
FIG. 4 depicts an embodiment of a process for transmitting incoming cellular signals to a mobile device located onboard an aircraft in accordance with some of the disclosed embodiments

FIG. 4 depicts an embodiment of a process 400 for transmitting incoming cellular signals and/or data to a mobile device located onboard an aircraft in accordance with some of the disclosed embodiments. Process 400 begins, at step 402, by receiving, at a switching center, an incoming call/data for a mobile device located onboard an aircraft. At step 404, the process converts the incoming call/data to the appropriate air-to-ground frequency utilized by the cellular transmission system of the aircraft on which the mobile device is located. The process, at step 406, transmits the incoming call/data to the respective cellular transmission system using the specially configured terrestrial towers. At step 408, the cellular transmission system forwards the incoming call/data information to a wireless base station 200 onboard the aircraft. The process, at step 410, converts the incoming call/data from the air-to-ground frequency utilized by cellular transmission system 140 to the service provider cellular network frequency associated with the intended mobile device located onboard the aircraft. At step 412, the process transmits the incoming call/data to the intended mobile device located onboard the aircraft, with process 400 terminating thereafter.

Accordingly, the disclosed embodiments provide, among other things, non-roaming cellular services to cellular devices onboard the aircraft. In addition, in some embodiments, the wireless base station may provide Internet access to Internet accessible devices located onboard the aircraft. Additionally, in some embodiments, the wireless base station is interfaced with an existing air-to-ground cellular transmission system of the aircraft. As will be appreciated by one skilled in the art, certain aspects of the disclosed embodiments may be embodied as an apparatus or method. In addition, certain components of the disclosed embodiments may be implemented entirely with hardware or as a software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. For instance, in some embodiments, cellular transmission system 140 may perform the process of converting signals between the air-to-ground frequency and a service provider cellular network frequency instead of the conversion being performed by wireless base station 200 as illustrated in the embodiments of FIG. 3 and FIG. 4. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A wireless base station for providing wireless services to mobile devices located onboard an aircraft, the wireless base station comprising:
    a plurality of transceivers for sending and receiving cellular signals at a plurality of cellular frequencies corresponding to a plurality of service provider networks associated with a plurality of mobile devices located onboard the aircraft for providing cellular service to the plurality of mobile devices;
    a conversion unit for converting the cellular signals from the plurality of cellular frequencies corresponding to one or more service provider networks to one or more coded cellular signals that are not detectable by conventional ground-based cell sites;
    a data storage component that includes access rules and quality of service (QoS) rules;
    a processing component configured to execute instructions to provide cellular services to only registered mobile devices using the access rules and for providing priority communication to particular mobile devices based on the QoS rules; and
    an interface for communicatively coupling the wireless base station to a cellular transmission system of the aircraft for transmitting the one or more coded cellular signals to a terrestrial tower configured to communicate with the cellular transmission system of the aircraft for enabling cellular communication to the plurality of mobile devices onboard an aircraft.

2. The wireless base station of claim 1, wherein the cellular transmission system is an existing system on the aircraft.

3. The wireless base station of claim 1, wherein one or more coded cellular signals are transmitted on an 800 MHz cellular frequency.

4. The wireless base station of claim 1, further comprising:
    a multiplexer for combining the one or more coded cellular signals into a single signal.

5. The wireless base station of claim 1, further comprising:
    a radio transceiver for sending and receiving data signals from a plurality of Internet accessible devices; the conversion unit for converting the data signals to a coded data signal that is not detectable by conventional ground-based cell sites, and the interface for communicatively coupling the wireless base station to the transmission system of the aircraft for transmitting the coded data signal to a terrestrial tower that is configured to communicate with the cellular transmission system of the aircraft for enabling Internet access to the plurality of Internet accessible devices.

6. The wireless base station of claim 1, further comprising:
    a demultiplexer for separating a combined signal received from the terrestrial tower via the cellular transmission system of the aircraft.

7. The wireless base station of claim 1, wherein the one or more transceivers supports a plurality of different network technologies including Global System for Mobile Communications (GSM) and Code Division Multiple Access (CDMA).

8. A method for providing wireless service to devices located onboard an aircraft, the method comprising:
    establishing communication between a cellular device and a transceiver of a wireless base station located onboard the aircraft using a cellular frequency of a cellular network associated with a service provider associated with the cellular device for providing cellular service to the cellular device;
    receiving, at the transceiver of the wireless base station, a cellular signal from the cellular device;
    determining whether to provide cellular services to the cellular device based on a set of access rules;
    responsive to a determination that cellular services is to be provided to the cellular device, converting, by the wireless base station, the cellular signal to a coded cellular signal that is not detectable by conventional ground-based cell sites;
    determining a priority communication level to grant to the cellular device based on a set of quality of service (QoS) rules;
    communicating, by the wireless base station, in accordance with the determined priority communication level, the coded cellular signal to a cellular transmission system of the aircraft for transmitting the coded cellular signal to a terrestrial tower that is configured to communicate with the cellular transmission system of the aircraft for facilitating cellular communication to the cellular device; and
    monitoring, by the wireless base station, usage data associated with the cellular device communication onboard the aircraft.

9. The method of claim 8, further comprising:
    routing the coded cellular signal from the terrestrial tower to a switching center; converting the coded cellular signal back to the cellular frequency associated with the service provider cellular network associated with the mobile device; and
    routing the cellular signal to the service provider cellular network associated with the cellular device.

10. The method of claim 8, further comprising:
routing the coded cellular signal from the terrestrial tower to a switching center; converting the coded cellular signal back to the cellular frequency associated with a contract service provider cellular network; and
routing the cellular signal to the contract service provider cellular network for facilitating cellular communication to the cellular device.

11. The method of claim 8, wherein the cellular transmission system is an existing system on the aircraft.

12. The method of claim 8, wherein the coded cellular signal is transmitted on an FCC approved 800 MHz air-to-ground radio frequency spectrum.

13. The method of claim 8, further comprising combining the coded cellular signal with other cellular signals into a single signal.

14. The method of claim 8, further comprising:
establishing communication between a wireless Internet accessible device and the wireless base station using a wireless data transmission protocol; receiving, at the wireless base station, a data signal from the wireless Internet accessible device; converting the data signal to a coded data signal that is not detectable by conventional ground-based cell sites, and communicating the coded data signal to the cellular transmission system of the aircraft for transmitting the coded data signal to a terrestrial tower that is configured to communicate with the cellular transmission system of the aircraft for facilitating Internet access to the to the wireless Internet accessible device.

15. The method of claim 8, further comprising:
receiving, at the wireless base station, an inbound coded cellular signal for the cellular device from the cellular transmission system of the aircraft; converting the inbound coded cellular signal to the cellular frequency associated with the service provider cellular network of the cellular device to generate a decoded cellular signal, and communicating the decoded cellular signal to the cellular device to facilitate cellular communication to the cellular device.

16. The method of claim 15, further comprising:
converting, at a switching center, an inbound cellular signal intended for the cellular device to the inbound coded cellular signal; transmitting the inbound coded cellular signal from the switching center to a terrestrial tower that is configured to communicate with the cellular transmission system of the aircraft; and
transmitting the inbound coded cellular signal from the terrestrial tower to cellular transmission system of the aircraft.

17. The method of claim 8, further comprising:
monitoring a duration of a call associated with the cellular device for the purpose of billing a subscriber associated with the cellular device.

18. A computer program product comprising a non-transitory computer usable medium having a computer readable program code embodied therein, said computer readable program code comprising instructions to: establish communication between a cellular device a wireless base station located onboard the aircraft using a cellular frequency associated with a service provider cellular network associated with the cellular device; receive, at the wireless base station, a cellular signal from the cellular device; determine whether to provide cellular services to the cellular device based on a set of access rules; responsive to a determination that cellular services is to be provided to the cellular device convert, by the wireless base station, the cellular signal to a coded cellular signal that is not detectable by conventional ground-based cell sites; determine a priority communication level to grant to the cellular device based on a set of quality of service (QoS) rules; communicate, by the wireless base station, in accordance with the determined priority, communication level, the coded cellular signal to a cellular transmission system of the aircraft for transmitting the coded cellular signal to a terrestrial tower that is configured to communicate with the cellular transmission system of the aircraft for facilitating cellular communication to the cellular device; and monitor usage data associated with the cellular device communication onboard the aircraft.

* * * * *